(12) United States Patent
Hall et al.

(10) Patent No.: US 9,102,212 B2
(45) Date of Patent: Aug. 11, 2015

(54) FRESH AIR SYSTEM FOR HEAVY DUTY VEHICLE CAB/SLEEPER COMBINATION

(75) Inventors: Gregory S. Hall, Bothell, WA (US); Richard Lo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 340 days.

(21) Appl. No.: 13/470,989

(22) Filed: May 14, 2012

(65) Prior Publication Data

US 2013/0303068 A1 Nov. 14, 2013

(51) Int. Cl.
*B60H 1/00* (2006.01)
*B60H 1/24* (2006.01)

(52) U.S. Cl.
CPC ............ *B60H 1/00378* (2013.01); *B60H 1/247* (2013.01)

(58) Field of Classification Search
CPC .......... B60H 1/00978; B60H 1/00364; B60H 1/00378; B60H 1/00071; B60H 1/247; B60N 2/688
USPC .......... 454/75, 139, 141, 145, 153, 164, 165; 165/202; 62/244
See application file for complete search history.

(56) References Cited

U.S. PATENT DOCUMENTS

| 4,172,494 | A | * | 10/1979 | Saulters | 165/43 |
| 5,975,422 | A | * | 11/1999 | Ordberg | 237/12.3 A |
| 6,062,975 | A | * | 5/2000 | Knudtson | 454/138 |
| 6,126,538 | A | * | 10/2000 | Kelly et al. | 454/143 |
| 6,367,271 | B2 | * | 4/2002 | Forrest et al. | 62/186 |
| 6,460,356 | B1 | | 10/2002 | Tao | |
| 6,470,960 | B2 | * | 10/2002 | Kampf et al. | 165/42 |
| 6,620,039 | B1 | | 9/2003 | Tao | |
| 2007/0063062 | A1 | | 3/2007 | Hernandez | |
| 2007/0131408 | A1 | | 6/2007 | Zeigler | |
| 2007/0149104 | A1 | | 6/2007 | Walterscheid | |
| 2007/0299560 | A1 | | 12/2007 | LaHue | |
| 2009/0301702 | A1 | * | 12/2009 | Zeigler et al. | 165/202 |

FOREIGN PATENT DOCUMENTS

DE 3908660 A1 * 10/1989 .............. B60H 1/00

OTHER PUBLICATIONS

Ruis et al., English Machine Translation of DE3908660, Oct. 1989.*

* cited by examiner

*Primary Examiner* — Gregory Huson
*Assistant Examiner* — Dana Tighe
(74) *Attorney, Agent, or Firm* — Christensen O'Connor Johnson Kindness PLLC

(57) ABSTRACT

Embodiments of the present disclosure are generally directed to a system for supplying fresh air to the aft compartment of a vehicle, such as a heavy-duty vehicle. The fresh air is not conditioned by heating or cooling prior to providing the fresh air to the cab.

8 Claims, 10 Drawing Sheets

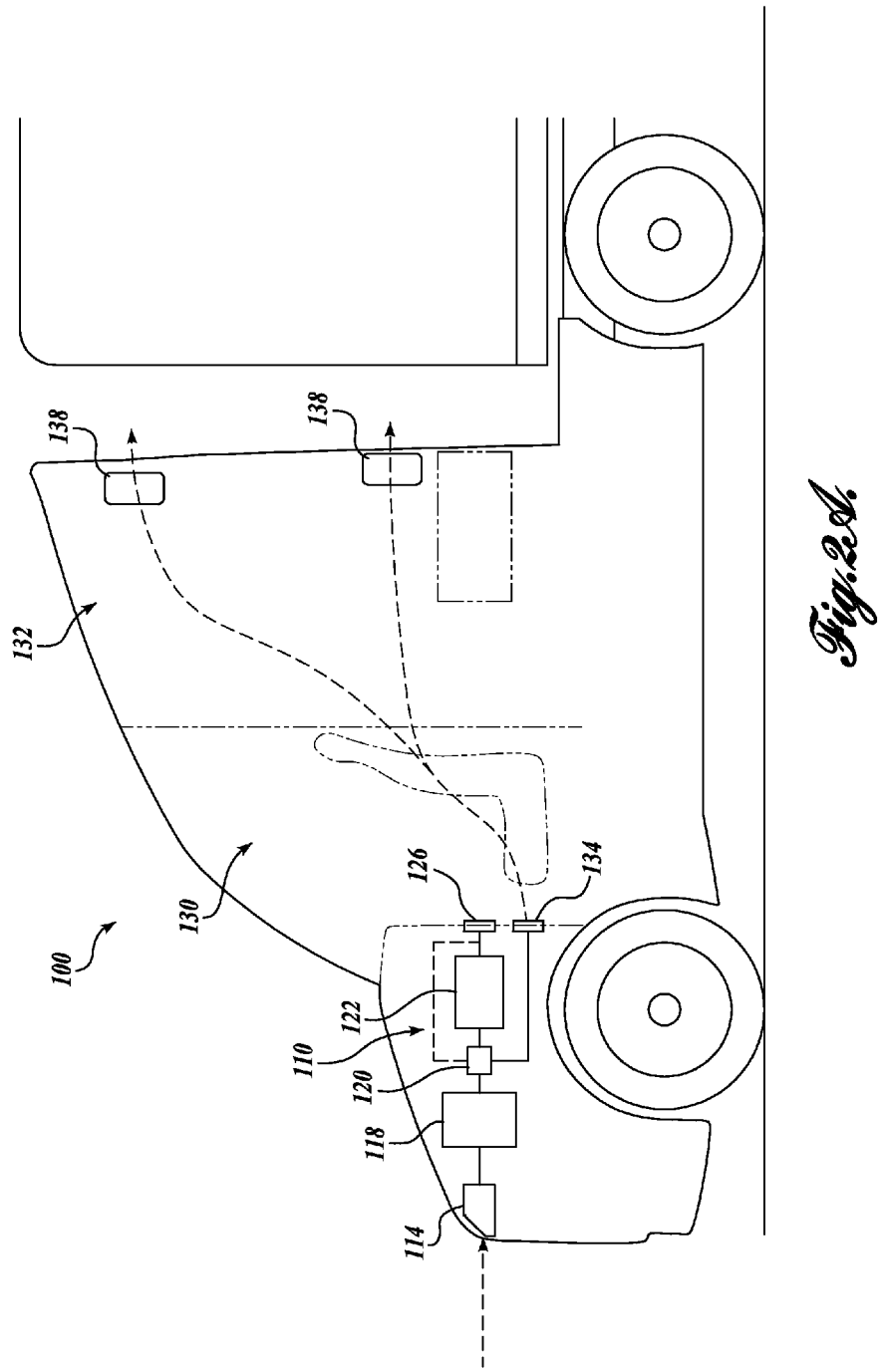

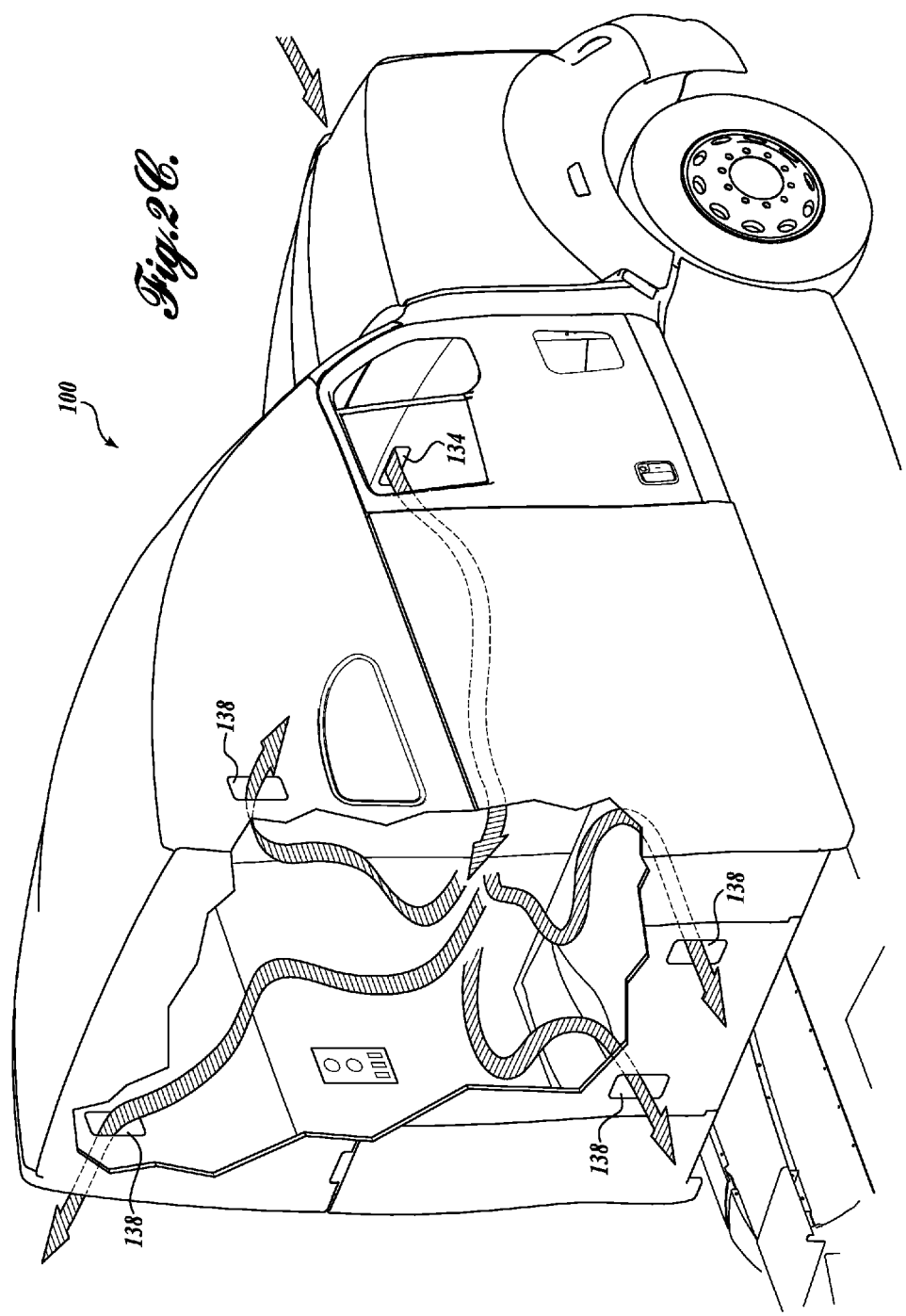

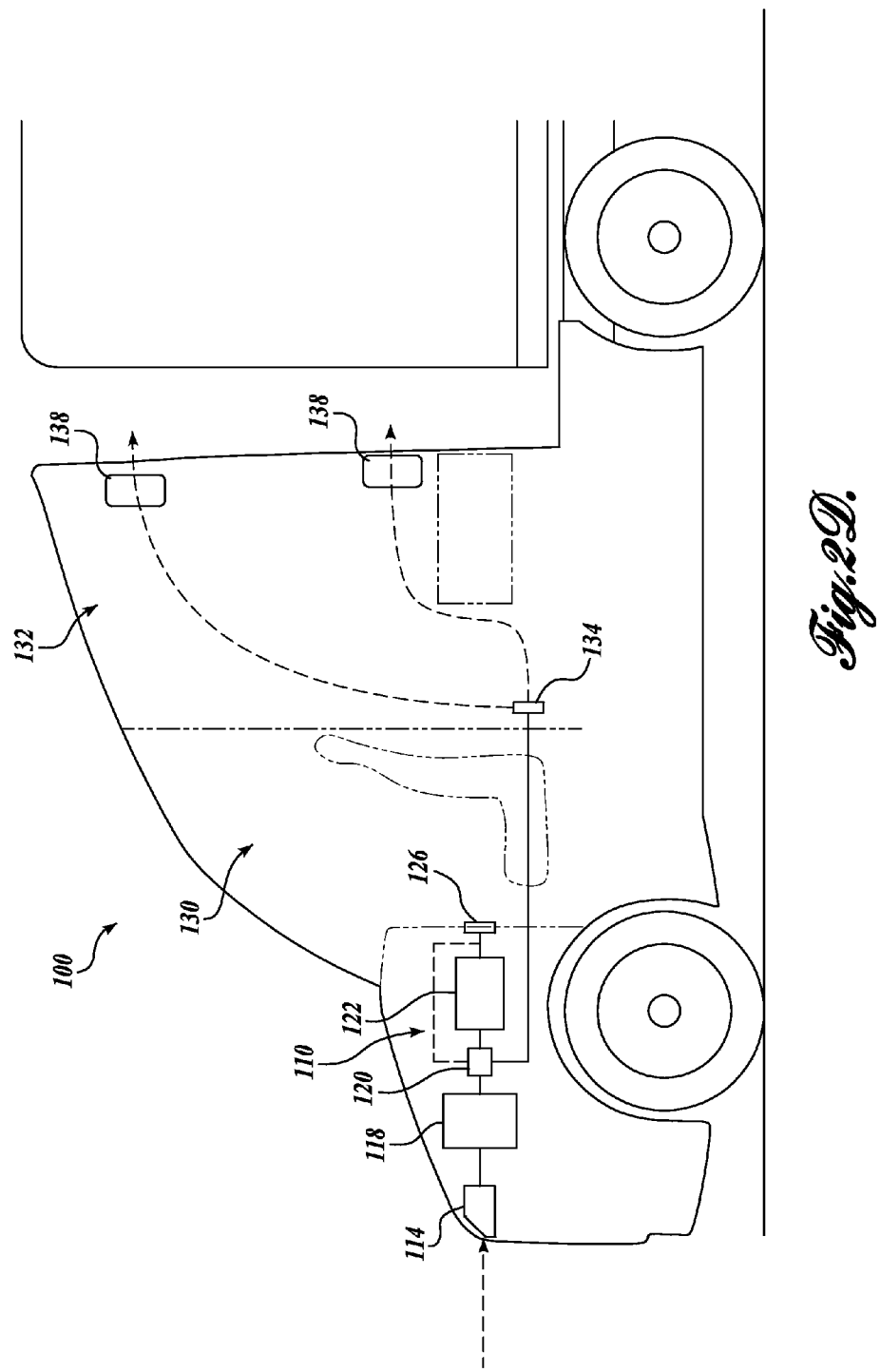

FRESH AIR SYSTEM FOR HEAVY DUTY VEHICLE CAB/SLEEPER COMBINATION

BACKGROUND

Heavy-duty trucks can be configured to include a "sleeper" compartment attached to the main cab in order to provide long-haul truck operators with a sleeping space inside the truck. For the comfort of the operator while using the sleeper, providing a flow of fresh air to the sleeper is essential. However, the state of the art with regard to sleeper ventilation is presently inadequate.

The traditional means for providing air to the sleeper of a truck is through a cab HVAC system. With reference to FIGS. 4, 5A, and 5B, a typical truck HVAC system 410 will be described. FIG. 4 schematically illustrates a typical HVAC system 410. FIGS. 5A and 5B illustrate side and plan views, respectively, of a typical sleeper truck equipped with an HVAC system 410 similar to that described in FIG. 4.

Air enters the HVAC system 410 via an inlet 414. The air then travels to a fan 418, which feeds accelerated air into an HVAC unit 422 that is configured to heat and/or cool the air provided by the fan 418, or other air moving component. Finally, the "conditioned" air is moved, still by the pressure from the fan 418, from the HVAC unit 422 through cab vents 426 and into the cab 430 of the truck 400.

In FIGS. 5A and 5B, air flow is generally illustrated using dashed arrows, including the flow of conditioned air from the cab vents 426 and the air flow between the cab 430 and sleeper 434. Diffusion is typically relied on for transmitting the conditioned air from the cab 430 to the sleeper 434. However, a typical truck HVAC system 410, such as those illustrated in FIGS. 4-5B, does not provide sufficient fresh air flow to a cab sleeper 434, when in a no-idle state, so as to make the sleeper 434 comfortable for an occupant. While some air may reach the sleeper 434 through diffusion with air in the cab 436, such conditioned air is not fresh air, because it has been heated or cooled.

Conditioned air and fresh air are distinct, as described herein As used herein, the term "treated" air or "conditioned" air means any air that has been heated or cooled intentionally prior to introduction of the air into a truck cab or sleeper. "Fresh air" is referred to herein as air that has not been conditioned prior to introduction into a cab or a sleeper. In current trucks, the amount of fresh air reaching the sleeper is insufficient. It will be appreciated that users of sleeper-equipped trucks attain superior comfort when fresh air is provided instead of, or in addition to, conditioned air.

The most common form of sleeper ventilation is through openable windows or through the use of vents (e.g., Salem vents), which are adjustable openings between the sleeper interior and the vehicle exterior and positioned at oppositely disposed sides of the sleeper. Such vents can provide ample fresh air when the vehicle is in motion, or when the vehicle is at rest and parked at such a position where a cross-breeze flows laterally through the sleeper between the oppositely disposed Salem vents on either side of the sleeper. Because a sleeper is typically only used when the vehicle is parked, reliance on Salem vents for ventilation depends on the unpredictable elements of both an external breeze and the ability to park the truck in a position that adequately captures the breeze.

One solution to the sleeper ventilation problems encountered when using Salem vents is to provide a separate no-idle HVAC system for the sleeper. A typical no-idle cab HVAC system is not adequately configured to provide sufficient fresh air flow to the sleeper; therefore a separate HVAC system for the sleeper can be utilized. However, the additional power (and cost) budget for a second HVAC system can be prohibitive.

Another solution for providing conditioned air to a sleeper is the use of an add-on fan, similar to a desktop fan, mounted in between the sleeper and cab such that conditioned air from the cab (e.g., from the cab-HVAC system) is circulated into the sleeper. Such a solution can be used instead of, or in addition to, Salem vents. However, add-on fans have been found to be ineffective in providing significant air flow and are an added cost and noise source.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a fresh air system for supplying fresh air to a vehicle interior comprising a forward compartment and an aft compartment is provided. In one embodiment, the fresh air system includes: a fresh air inlet in gaseous communication with an exterior of the vehicle; at least one fresh air vent associated with the forward compartment or the aft compartment, the at least one fresh air vent configured to supply fresh air to the aft compartment; and a bypass valve configured to controllably direct fresh air into the fresh air vent, into an HVAC unit, or a combination thereof.

In another aspect, a vehicle is provided. In one embodiment, the vehicle includes: a fresh air inlet in gaseous communication with an exterior of the vehicle; an HVAC unit configured to condition air and move the conditioned air into at least one HVAC vent configured to supply conditioned air to an interior of the vehicle; at least one fresh air vent configured to supply fresh air to the interior of the vehicle; a bypass valve configured to controllably direct fresh air into the fresh air vent, into the HVAC unit, or a combination thereof; and a fan configured to move air from the fresh air inlet, into the bypass valve, and further into the fresh air vent, HVAC unit, or a combination thereof, depending on the configuration of the bypass valve.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2C illustrate a representative embodiment of the system of FIG. 1 disposed in a vehicle such as a tractor with a sleeper cab, wherein FIG. 2A is a side view, FIG. 2B is a plan view, and FIG. 2C is a partial-cutaway isometric view;

FIG. 2D is a side view of another embodiment of a system for providing fresh air to a truck sleeper cab in accordance with aspects of the present disclosure;

FIGS. 5A and 5B illustrate a sleeper truck equipped with an HVAC system as known to those of skill in the art, wherein FIG. 5A is a side view and FIG. 5B is a plan view.

DETAILED DESCRIPTION

Figure 1:
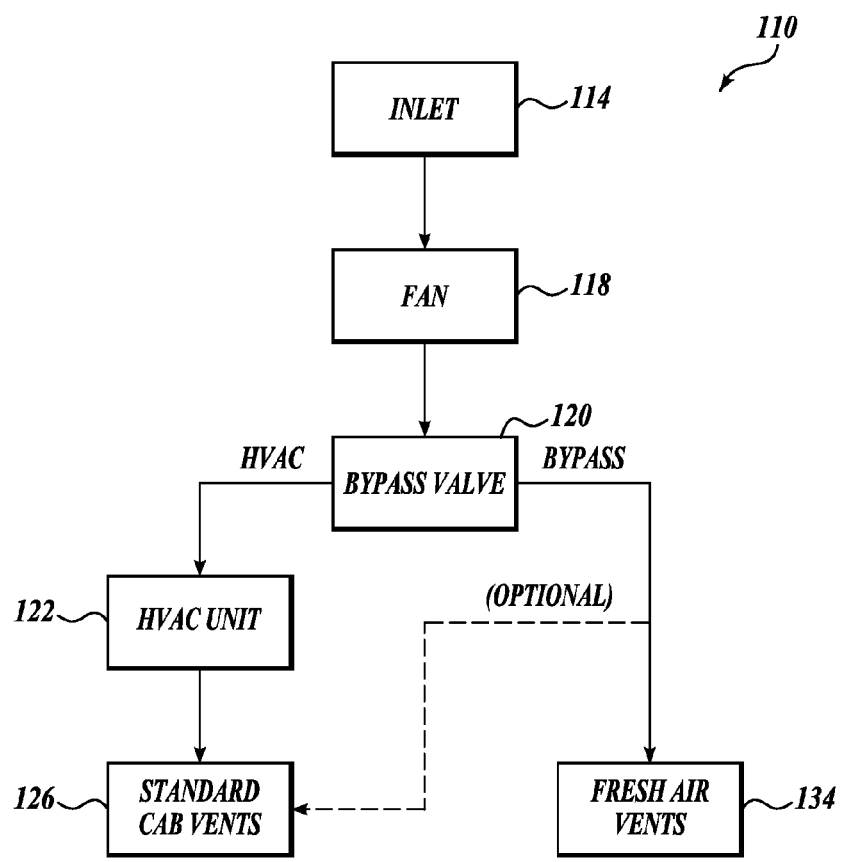
FIG. 1 schematically illustrates an example of a system for providing fresh air to a truck cab and sleeper in accordance with aspects of the present disclosure.

Embodiments of the present disclosure are generally directed to a system for supplying fresh air to the sleeper cab of a heavy-duty truck. A system in accordance with one embodiment of the present disclosure may be better understood by referring to FIGS. 1-2C, which illustrate a representative fresh air system 110 for supplying fresh air to a cab 130 and sleeper 132 of a truck 100. In the illustrated system 110, fresh air moves from an inlet 114, which is in gaseous flow communication with an exterior of the truck 100, so as to provide fresh air from outside of the truck 100 into the fresh air system 110. A blower or fan 118 is connected to the inlet 114 and accelerates the flow rate of fresh air towards a bypass valve 120. The bypass valve 120 is configured to direct the fresh air either to a HVAC unit 122 (the "HVAC" route), to fresh air vents 134 (the "bypass" route), or a combination of the two. Accordingly, by incorporating the bypass valve 120, a system 110 is provided for directing fresh air flow into a truck cab 130 by bypassing the HVAC system traditionally used to provide (conditioned) air to a truck cab (e.g., cab 430). Furthermore, the fresh air provided by the system 110 can be directed into the sleeper of the truck 100 with superior flow volume when compared to the systems for providing air to a sleeper as known in the prior art.

If the bypass valve 120 is set to "HVAC" mode, all fresh air from the fan 118 is directed into the HVAC unit 122. After the air is conditioned (i.e., the "fresh" air becomes "conditioned" air) in the HVAC unit 122, the conditioned air passes through standard cab vents 126 so as to heat or cool the cab 130 of the truck 100. Accordingly, the bypass valve 120 provides a mechanism whereby fresh air is provided to the truck cab 130 without passing through the HVAC unit 122. If the bypass valve 120 is set to "bypass" mode, fresh air passes from the fan 118, through the bypass valve 120, and directly into the cab 130 of the truck 100 through the fresh air vents 134. In an optional embodiment, the bypass valve can also be connected directly to the standard cab vents 126 through appropriate ducting. By incorporating the bypass valve 120, a system is provided for directing fresh air flow into a truck cab 130 by bypassing the HVAC system traditionally used to provide (conditioned) air to a truck cab (e.g., cab 430).

Figure 2B:
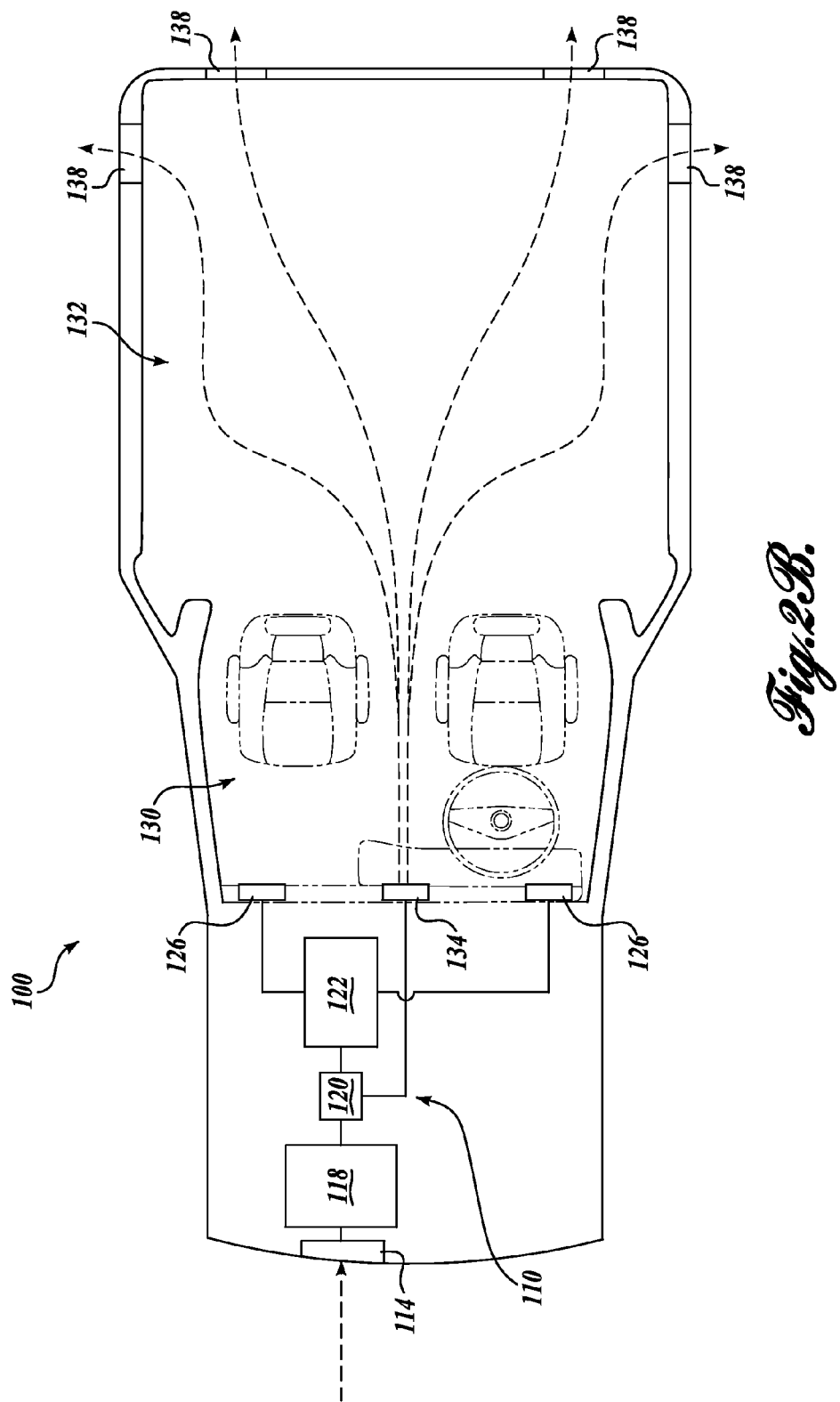

The system 110 described above may be better understood by referring specifically to FIGS. 2A-2C, in which an exemplary truck 100 is illustrated that incorporates the fresh air system 110. The truck 100 is shown as divided into a cab 130 and a sleeper 132. The fan 118 delivers fresh air from outside of the truck 100, via the inlet 114, to the bypass valve 120. The bypass valve 120 can be configured to deliver fresh air to the cab via fresh air vents 134. Optionally, the bypass valve 120 can be configured to deliver fresh air through the standard cab vents 126, as well, without the fresh air passing through the HVAC unit 122. As noted above, the bypass valve 120 can also be switched to operate in HVAC mode, whereby all of the air passing through the bypass valve 120 is directed into the HVAC unit 122 and into the cab 130 via standard cab vents 126. A combination of the two modes of operation (HVAC and bypass) can also be used.

While representative air flow paths are illustrated in FIGS. 2A-2C, it will be appreciated that these are idealized air paths and air may travel from the fresh air vent 134, through the cab 130, into the sleeper 132, and through the vents 138 in any manner.

The components of the fresh air system 110 will now be described in more detail. The inlet 114 is a typical air-intake inlet of the type mounted on heavy-duty trucks, as known to those of skill in the art. Any design and configuration of inlet 114 is useful in the provided embodiments, as long as air from outside the truck 100 is allowed to pass through the inlet 114 and into the fan 118.

The fan 118 can be a typical rotary fan as known to those of skill in the art. In certain embodiments, the fan 118 is a typical HVAC fan found on a commercially-produced heavy-duty truck (e.g., fan 418). In other embodiments, the fan 118 may be a high-volume fan that is configured to provide a greater air-flow volume than a typical HVAC fan. For example, a typical HVAC fan on a heavy-duty truck provides a maximum flow of about 200 ft$^3$/min, whereas a representative high-volume fan provides a maximum flow of about 300 ft$^3$/min.

The bypass valve 120 is a three-way valve that allows air provided by the fan 118 to be controllably directed into the HVAC unit 122 or the fresh air vents 134. In certain embodiments, the bypass valve 120 controllably switches between directing air into only the HVAC unit 122 or the fresh air vents 134. In other embodiments, the bypass valve 120 can direct air into both the HVAC unit 122 and the fresh air vents 134. It will be appreciated that while the bypass valve 120 is illustrated and described as a three-way valve, a higher-order valve (e.g., four-way) is also contemplated, as long as the valve can direct air to either the HVAC unit 122 or the fresh air vents 134. The fresh air vents 134 are sized, oriented, and configured to deliver fresh air through the cab 130 and into the sleeper 132, so as to provide fresh air to an occupant thereof.

FIG. 2D is a side view of an alternative embodiment of the fresh air system 110 of FIG. 2A. The variation between the illustrated embodiments is that the fresh air vent(s) 134 outlet into the sleeper compartment 132 in FIG. 2D, instead of the cab compartment 130 in FIG. 2A. It will be appreciated that the fresh air system 110 can be configured in any number of ways to provide fresh air to the sleeper compartment 132. For example, multiple fresh air vents 134 can be used throughout the cab 130 and/or sleeper 132 in order to provide sufficient fresh air for the comfort of the operator. In certain embodiments, the fresh air vent 134 is located in only the cab 130. In another embodiment, the fresh air vent 134 is located only in the sleeper 132. In yet another embodiment, there is at least one fresh air vent 134 in each of the cab 130 and the sleeper 132.

Figure 3A:
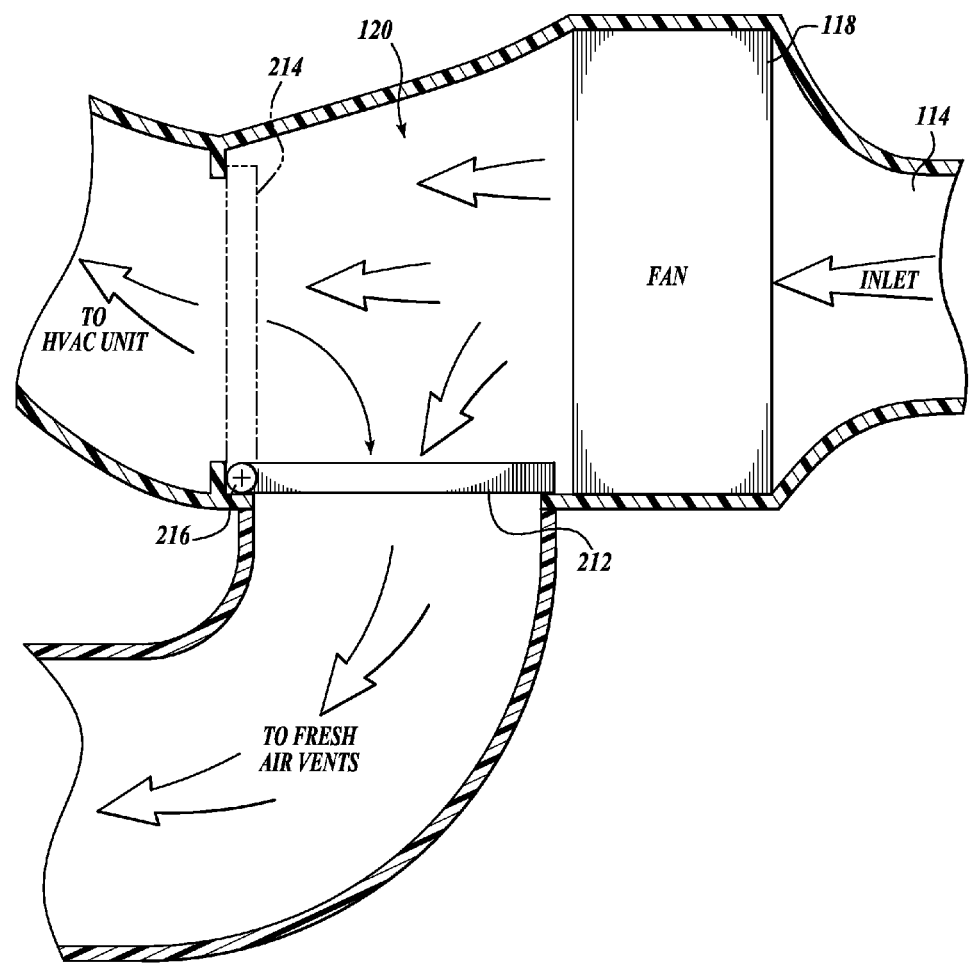
FIGS. 3A and 3B are cross-sectional views of two representative embodiments of a bypass valve in accordance with aspects of the present disclosure.

Several embodiments of the bypass valve 120 will now be described with reference to FIGS. 3A and 3B. Referring now to FIG. 3A, the bypass valve 120 in one embodiment is a flipper-style valve, wherein a flipper 212 is used to direct air to either the cab HVAC unit 122 or directly to the fresh air vents 134. Specifically, fresh air is provided from the inlet 114 to a fan 118 that moves the air into the bypass valve 120. If the bypass valve 120 has the flipper 212 positioned as illustrated, the fresh air will pass to the cab HVAC unit 122 for conditioning prior to passing into the cab 130 through standard cab vents 126. However, if the bypass valve 120 is switched such that the flipper 212 is in position 214, after rotating about an axis 216, the fresh air will be directed from the fan 118, through the bypass valve 120, and directly to the fresh air vents 134. It will be appreciated that the flipper 212 can be mechanically or electronically actuated between the two positions.

In certain embodiments, the flipper 212 can be actuated to a position intermediate the two positions illustrated in FIG. 3A, such that the air flow is divided between the routes to the cab HVAC unit 122 and the route to the fresh air vents 134.

Figure 3B:
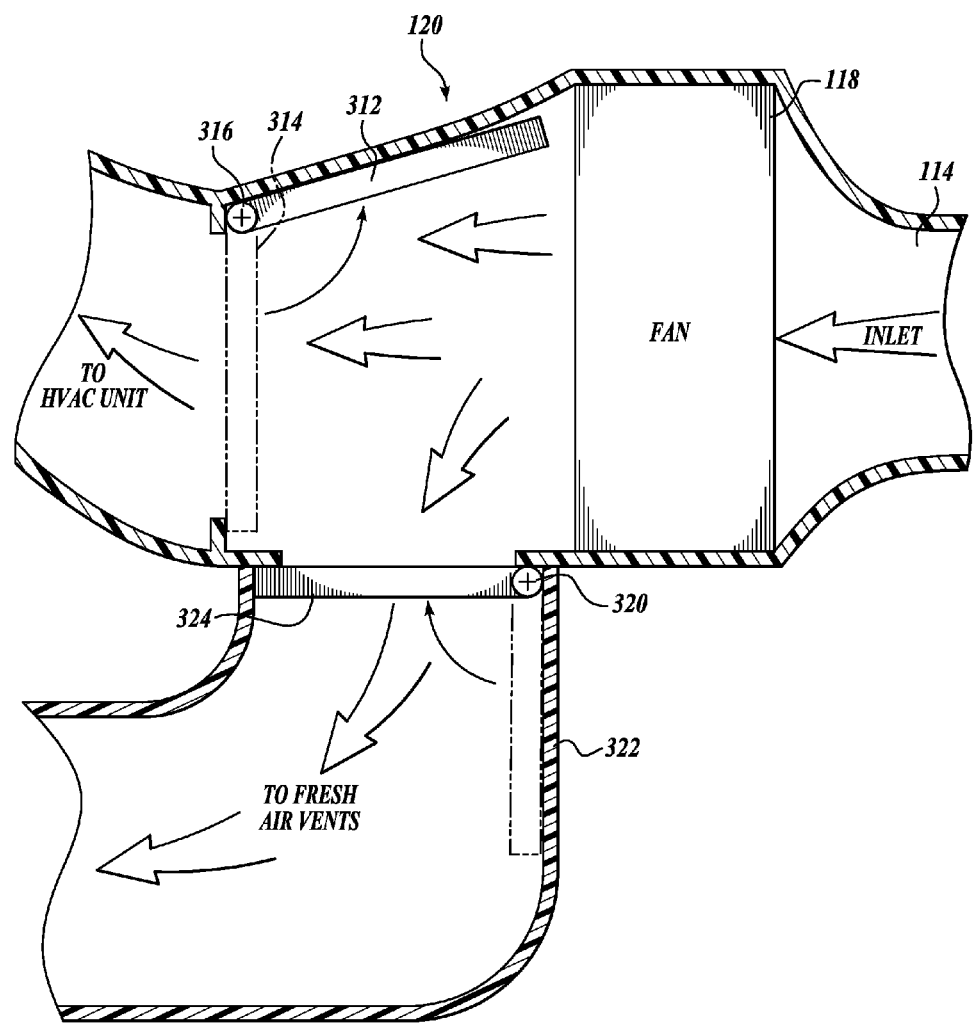
Figure 4:
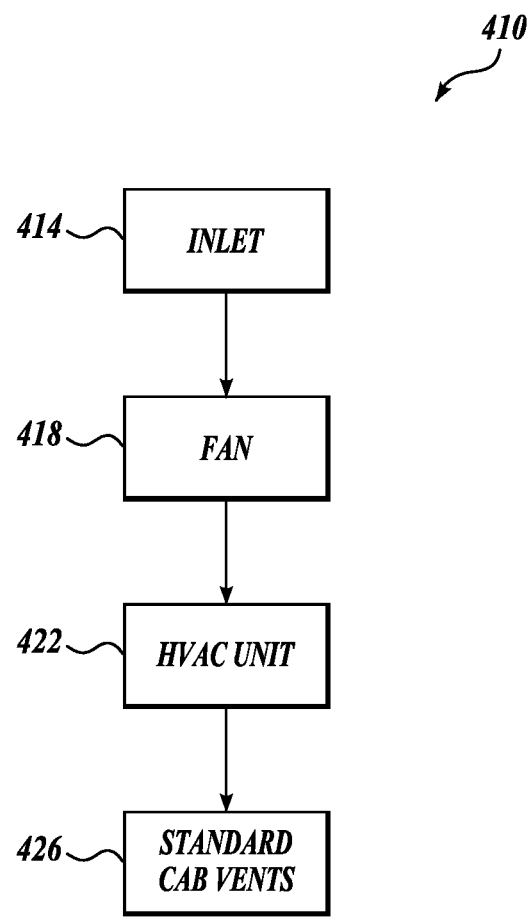
FIG. 4 schematically illustrates an HVAC system for providing conditioned air to a truck, as known to those of skill in the art.
Figure 5A:
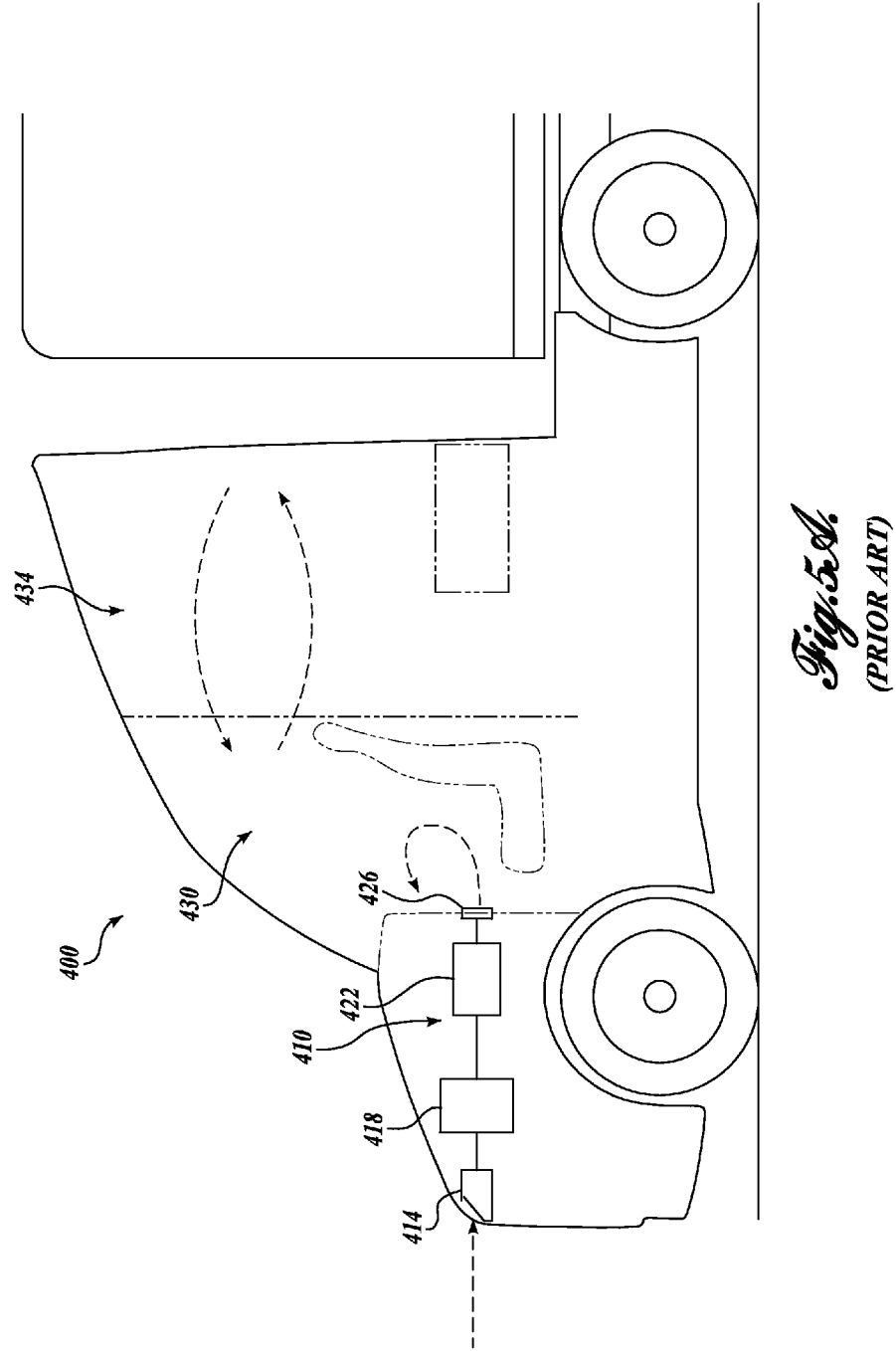
Figure 5B:
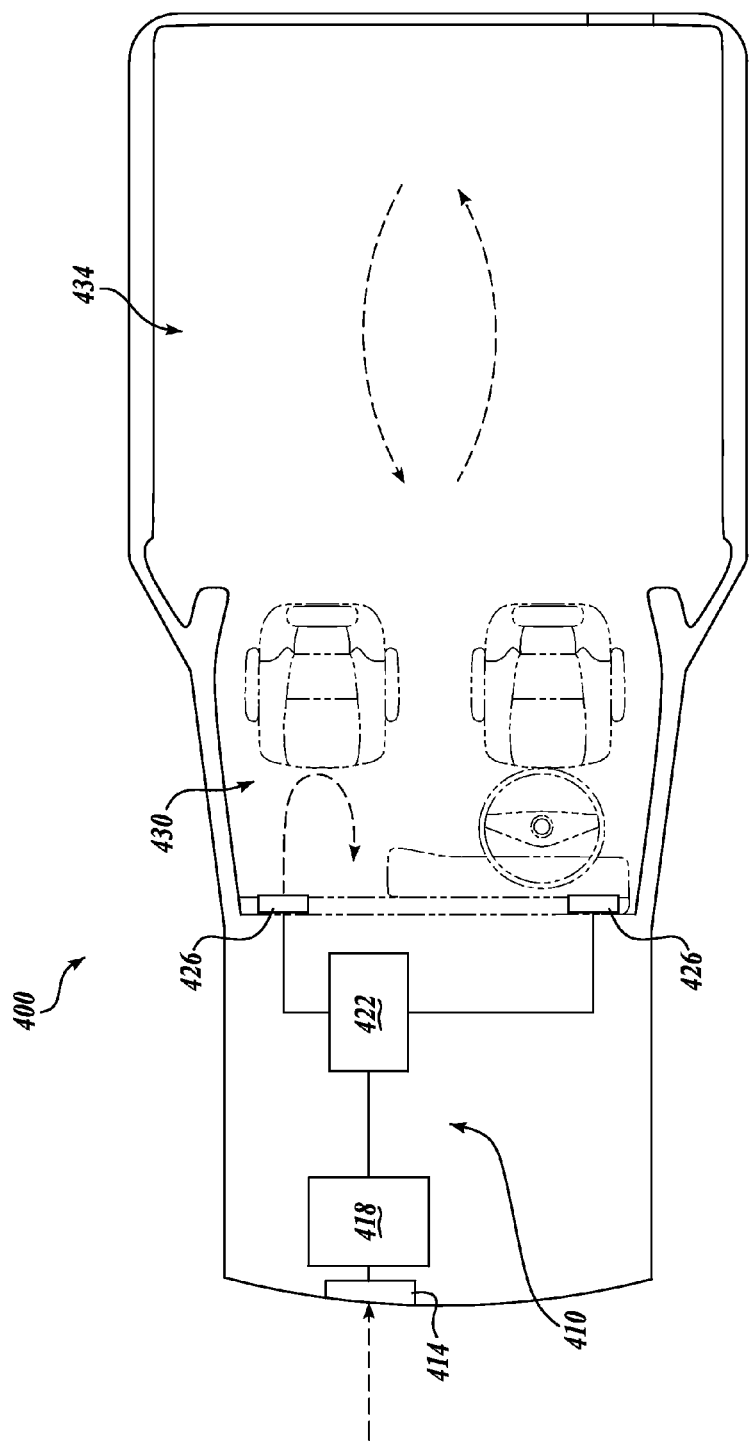

Referring now to FIG. 3B, another embodiment of a bypass valve 120 is illustrated. In the embodiment illustrated in FIG. 3B, dual flippers 312 and 324 are used. Conversely, only a single flipper 212 is used in the embodiment of FIG. 3A. By using dual flippers 312 and 324, the amount of air passing into both the HVAC unit 122 and the fresh air vents 134 is controlled individually by a dedicated flipper. For example, HVAC flipper 312 controls the air flow from the fan 118 into the cab HVAC unit 122 by rotating about an axis 316 between the position illustrated and position 314. Similarly, the fresh air flipper 324 rotates about an axis 320 to a second position 322 to control the amount of fresh air passing from the fan 118 into the ducting leading to the fresh air vents 134. By using a dual flipper valve configuration, as illustrated in FIG. 3B, the volume of air flowing into each of the HVAC unit 122 and the fresh air vents 134 is controlled individually, as opposed to the embodiment of FIG. 3A, wherein the position of the single flipper 212 determines both the amount of air flowing to the HVAC unit 122 and the amount of air flowing to the fresh air vents 134.

As illustrated in FIGS. 2A-2C, air flow from the fresh air vent 134 travels through the cab 130 into the sleeper 132, and passes outside the truck 100 through exterior vents 138. The exterior vents 138 can be any vents known to those of skill in the art, as long as they allow the fresh air to pass from the sleeper 132 to the outside of the truck 100.

Representative vehicles equipped with the provided fresh air system 110 include heavy-duty trucks, such as Class 8 trucks. In certain embodiments, sleeper trucks are equipped with the fresh air system 110 so as to provide fresh air to an occupant of the sleeper compartment, particularly when the truck is parked and in a no-idle state. As used herein, the term "no-idle" refers to a state of the vehicle where the engine is shut off, but certain other, non-engine systems, are still in operation.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A fresh air system for supplying fresh air to a vehicle interior comprising a forward compartment and an aft compartment, the fresh air system comprising:
    a fresh air inlet in gaseous communication with an exterior of the vehicle;
    an HVAC unit in gaseous communication with the fresh air inlet and configured to condition fresh air received from the fresh air inlet;
    at least one cab vent located in the forward compartment and in gaseous communication with the HVAC unit, the at least one cab vent configured to supply conditioned air from the HVAC unit to the forward compartment;
    at least one fresh air vent located in the aft compartment and in gaseous communication with the fresh air inlet, the at least one fresh air vent configured to supply fresh air to the aft compartment;
    a bypass valve configured to controllably direct fresh air into the at least one fresh air vent, into the HVAC unit, or into a combination thereof; and
    a fan configured to accelerate a flow rate of fresh air from the fresh air inlet through the bypass valve and into one or more of the at least one fresh air vent or the HVAC unit, wherein the fan has a maximum flow rate greater than about 200 ft3/min;
    wherein the fan is configured to operate with the bypass valve directing the fresh air at least in part toward the at least one fresh air vent when the vehicle is in a no-idle state and an engine of the vehicle is off in the no-idle state.

2. The fresh air system of claim 1, further comprising one or more vents disposed in the aft compartment configured to allow the fresh air directed from the fan to exit the aft compartment.

3. The fresh air system of claim 1, wherein the bypass valve is a flipper valve.

4. The fresh air system of claim 3, wherein the flipper valve comprises a single flipper configured to controllably block air flow to either the fresh air vent or the HVAC unit.

5. The fresh air system of claim 3, wherein the flipper valve comprises an HVAC flipper configured to controllably block air flow to the HVAC unit and a fresh air flipper configured to controllably block air flow to the fresh air vent.

6. The fresh air system of claim 1, wherein the at least one fresh air vent is disposed only in the aft compartment.

7. A vehicle comprising:
    a fresh air inlet in gaseous communication with an exterior of the vehicle;
    an HVAC unit configured to condition air and move the conditioned air into at least one HVAC vent located in a forward compartment of the vehicle and configured to supply conditioned air to the forward compartment of the vehicle;
    at least one fresh air vent located in an aft compartment of the vehicle and configured to supply fresh air to the aft compartment of the vehicle;
    a bypass valve configured to controllably direct fresh air from the fresh air inlet into the fresh air vent, into the HVAC unit, or into a combination thereof; and
    a fan configured to move air from the fresh air inlet through the bypass valve and into one or more of the fresh air vent, the HVAC unit, or a combination thereof, depending on the configuration of the bypass valve, wherein the fan has a maximum flow rate greater than about 200 ft3/min;
    wherein the fan is configured to operate with the bypass valve directing the fresh air at least in part toward the at least one fresh air vent when the vehicle is in a no-idle state and an engine of the vehicle is off in the no-idle state.

8. The fresh air system of claim 1, wherein the fan has a maximum flow rate of up to about 300 ft3/min.

* * * * *